United States Patent [19]

Van Dijck et al.

[11] Patent Number: 6,145,219

[45] Date of Patent: Nov. 14, 2000

[54] ROOM AND METHOD FOR DEFROSTING PRODUCTS

[75] Inventors: Franciscus Henricus Johannes Van Dijck, Deventer; Johannes Martinus Hubertus Kortenbach, Twello, both of Netherlands

[73] Assignee: Raadgevend Bureau Kortenbach B.V., Deventer, Netherlands

[21] Appl. No.: 09/118,709

[22] Filed: Jul. 17, 1998

Related U.S. Application Data

[63] Continuation of application No. PCT/NL97/00038, Feb. 6, 1997.

[30] Foreign Application Priority Data

Feb. 7, 1996 [NL] Netherlands ............................ 1002267

[51] Int. Cl.[7] ...................................................... F26B 3/00
[52] U.S. Cl. ............................ 34/476; 491/492; 491/497; 491/565; 491/579
[58] Field of Search ............................. 34/380, 391, 395, 34/443, 476, 487, 491, 492, 493, 497, 565, 579, 202, 209, 666; 165/48.1, 80.3, 125, 185; 62/211, 223, 515, 516

[56] References Cited

U.S. PATENT DOCUMENTS

| | | | |
|---|---|---|---|
| 3,129,072 | 4/1964 | Cook et al. .............................. 34/565 |
| 3,324,566 | 6/1967 | Dietert .................................. 34/565 X |
| 5,144,754 | 9/1992 | Persson .................................... 34/491 |
| 5,179,789 | 1/1993 | Stroud et al. ......................... 34/497 X |

FOREIGN PATENT DOCUMENTS

| | | |
|---|---|---|
| 0016737 | 10/1980 | European Pat. Off. . |
| 0298063 | 1/1989 | European Pat. Off. . |
| 0381609 | 8/1990 | European Pat. Off. . |
| 1920341 | 11/1969 | Germany . |
| 2934022 | 3/1981 | Germany . |
| 56-164778 | 12/1981 | Japan . |
| 61-152270 | 7/1986 | Japan . |

OTHER PUBLICATIONS

Patent Abstracts of Japan of JP 56164778 of Dec. 1981.
Patent Abstracts of Japan of JP 61152270 of Jul. 1986.

*Primary Examiner*—Stephen Gravini
*Attorney, Agent, or Firm*—Ladas & Parry

[57] ABSTRACT

A room for bringing products to a specific desired temperature. The room is provided with a heat or cold source and detectors for measuring temperature in the room at a plurality of locations. A number of fans are positioned in the room in the region of a wall, floor or ceiling. In a prepared embodiment, the fans are displacable in a line along a wall, floor or ceiling of the room. In another embodiment, the fans are placed at a regular distance above one another. The line of fans may be displaced backwards and forwards along the wall from one corner of the room to the other. There is also provided a method of defrosting products, such as meat.

20 Claims, 2 Drawing Sheets

ROOM AND METHOD FOR DEFROSTING PRODUCTS

This application is a continuation of International Application PCT/NL/97/00038 filed on Feb. 6, 1997, and which designated the U.S., claims the benefit thereof and incorporates the same by reference.

FIELD OF INVENTION

The invention relates to a room which serves to bring products to a specific desired temperature, which room is provided with first means for bringing the room to a specific desired temperature, or holding the room at a specific desired temperature, which first means comprise means for supplying or removing heat, such as a heat source or a cold source, measuring means for measuring the temperature at a plurality of locations in the room and at least one fan. Products regularly have to be brought to a predetermined, desired temperature. For example, products for consumption, such as meat, fish, etc., are brought to a temperature far below the freezing point in order for it to be possible to store them for a long period, so-called deep-freezing. Such products then have to be returned to a temperature above the freezing point, which is the process of defrosting these products, in order to make these products suitable for processing and consumption; another possibility is that products are brought to a temperature above or below zero from a higher or lower temperature, because the product can then be processed further more easily, the so-called temperature-controlling of products. This temperature-controlling may be important for certain operations, since, for example, a product can be cut or processed further in various ways at a specific temperature.

BACKGROUND OF INVENTION

In order to bring a number of products to a specific desired temperature, these products can be placed in a sealable room in which the temperature can be controlled. Possible examples are products such as foodstuffs, which are stored deep-frozen. In order to keep products, such as meat and other perishable foodstuffs, suitable for consumption for a relatively long period, these products are stored at a temperature below the freezing point. In order then to be able to process further or consume these items, these products have to be returned at a specific time to a specific temperature above the freezing point.

Particularly in the case of perishable goods, such as meat, it is extremely important not to overheat these articles during defrosting, but to defrost them extremely gradually. If parts of these products are overheated, these products will keep for a much shorter period, and moreover the taste will be impaired. It takes a very long time to return large pieces of meat, such as carcasses, to a temperature above zero degrees, for example four degrees Celsius, while the ambient temperature while the carcass is being warmed up may not be much higher, for example not above six degrees Celsius. The higher the ambient temperature during defrosting, the quicker the goods will reach the desired temperature but the shorter the time will be that the product then remains suitable for human consumption.

The European patent application EP-A 0 298 063 discloses a tunnel in which a fan is used to maintain a maximum flow of air in the tunnel during the entire thawing process. However, the single fan does not give a uniform air flow, since the air flow will be considerably nearer the fan than at a distance from the fan. The products near the fan will therefor be thawed more quickly than the other products.

SUMMARY OF INVENTION

The object of the invention is a room in which goods can all be brought within the same time to a specific desired final temperature more quickly than has hitherto been customary without exceeding a predetermined temperature. The object comprises both heating and cooling products to a specific final temperature, thus, for example, a defrosting tunnel in which deep-frozen products, such as meat, are returned to a specific temperature above zero degrees Celsius within a specific period in order to be able to process these products further.

This object is achieved according to the invention using a room or defrosting tunnel which comprises a line of fans placed at a regular distance from one another, which line can be displaced along one or more walls, floor or ceiling of the room with the aid of displacement means. Walls are also understood to include the floor or the ceiling. These measures mean that the air is displaced very efficiently through the room, as a result of which the air temperature in the region of the surface of the products is always more or less the maximum permitted temperature. It has been found that the temperature in the whole room remains very constant during the entire defrosting process, and it has also been found that energy is saved, since the contents of the room are heated very efficiently and constantly, as a result of which the desired final temperature of the carcasses is reached in a shorter time than was hitherto possible.

BRIEF DESCRIPTION OF DRAWINGS

The invention will be explained in more detail with reference to the drawing, in which.

DETAILED DESCRIPTION

Figure 1:
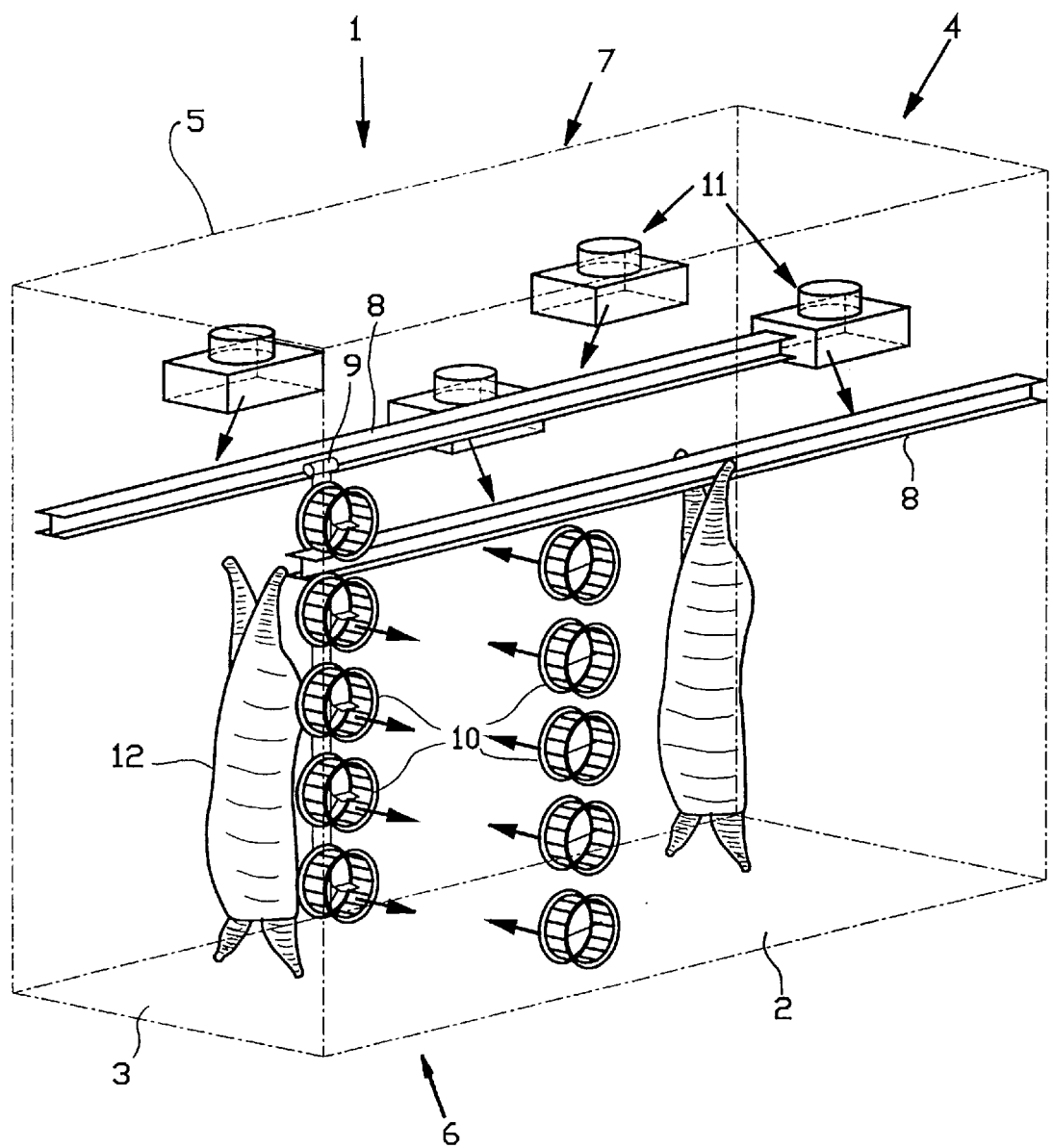
FIG. 1 diagrammatically shows a room for defrosting deep-frozen meat, with means for holding the room at the desired temperature.
Figure 2:
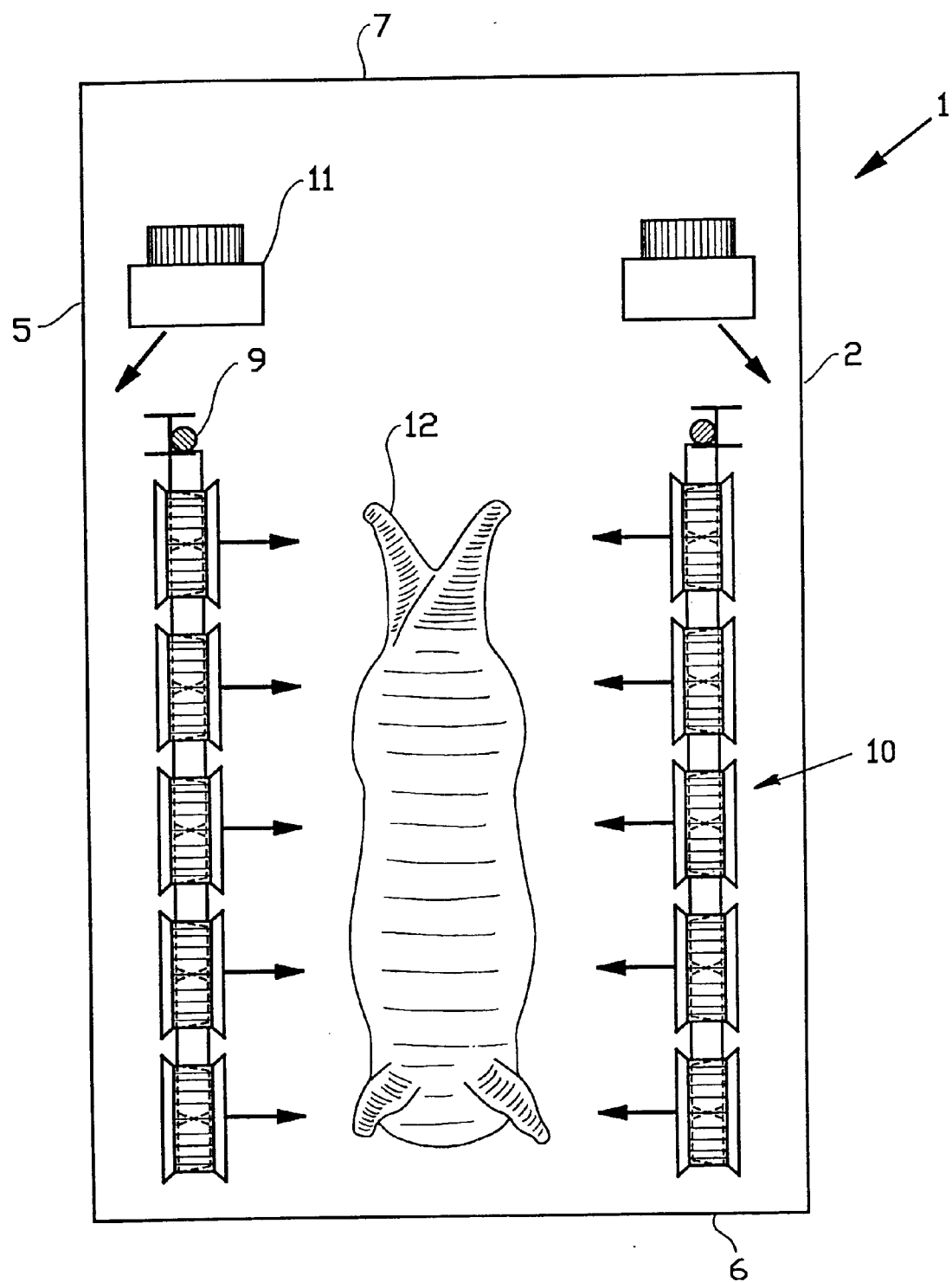
FIG. 2 shows a cross-section through a defrosting room in accordance with the invention.

FIG. 1 and FIG. 2 diagrammatically show a room 1, comprising a front wall 2, two side walls 3, 4 and a back wall 5, as well as a floor 6 and a ceiling 7. The room is insulated, so that the temperature in the room can be kept very constant, either above or below the freezing point. A running rail 8, with a carriage 9 which can travel backwards and forwards along the running rail, is arranged on the inside of the front wall 2 and the rear wall 5, near the ceiling, over the entire length of the walls. A number of fans 10, which all generate an air flow which is directed away from the wall, are fastened one beneath the other on the underside of the carriage 9. Near the top are positioned four heat sources 11 with fans, which fans blow the hot air coming from the heat sources from top to bottom along the front and rear wall, respectively, of the room. The whole assembly is preferably electronically and computer-controlled.

The defrosting method is, for example, as follows: a number of deep-frozen cows 12, which are to be processed and cut up after a few days, for example after the weekend, are hung in the defrosting tunnel 1. In order to be able to process the carcasses 12, the carcasses should therefore, for example on Monday morning, be at a temperature of four degrees Celsius. Before the weekend, therefore, i.e. on Friday evening, the carcasses are placed in this room, the temperature of the room being kept below zero. Temperature detectors are then positioned at a number of locations, generally thermocouples, which should then be positioned at a number of predetermined locations. It is important that a number of temperatures in the entire room be measured. A number of temperatures should also be measured at a number of locations on and in a number of actual products, that is to say in the interior of a number of products, the corners of the actual products being particularly important, since the temperature of the product will rise more quickly at the corners, as the surface area with respect to volume is much larger at the corners than in the rest of the product. On the basis of the measurements, the measurement data of which are fed to a computer, it is possible to control the heat provided by the heat sources, that is to say the amount of heat which is to be supplied to the room. It is important in this connection that no parts of the products exceed a specified desired temperature, which temperature may often only be slightly higher than the desired final temperature. The speed at which the line of fans is displaced can then also be controlled and adjusted, as can the rotational speed or intensity. The installation should then be started up at a specified time, after which the contents will then gradually be warmed up to the desired final temperature. It can be determined experimentally how much time is required for the contents of a room to reach a specific final temperature.

We claim:

1. A room for bringing products to or holding products at a desired temperature, said room comprising:

first means for supplying heat to or removing heat from the room;

measuring means for measuring temperature at a plurality of locations in the room;

a first plurality of fans disposed in a first line and spaced apart from one another; and displacement means for displacing the first plurality of fans in line along at least one wall, floor or ceiling of the room.

2. A room according to claim 1, wherein the first plurality of fans are disposed in line one above another and said displacement means displaces the plurality of fans in line back and forth along the at least one wall from one end of the room to another.

3. A room according to claim 2, comprising a second plurality of fans disposed one above another in a second line and spaced apart from one another, said first and second lines being disposed on opposite sides of the room along said at least one wall and a second wall of the room respectively, said displacement means displacing the first and second lines back and forth along the respective at least one and second walls from one end of the room to another.

4. A room according to claim 1, comprising measuring and control means for controlling a speed at which the first plurality of fans are displaced along said at least one wall, floor or ceiling based upon temperatures measured by said measuring means.

5. A room according to claim 2, comprising measuring and control means for controlling a speed at which the first plurality of fans are displaced along said at least one wall based upon temperatures measured by said measuring means.

6. A room according to claim 1, wherein the first means supplies heat to the room.

7. A room according to claim 1, wherein the first means removes heat from the room.

8. A method of defrosting products in a room comprising (a) placing a plurality of frozen products into the room with a plurality of temperature detectors arranged at a plurality of locations in or on said plurality of products;

(b) defrosting the plurality of products with circulation of air in the room, said air being circulated in the room by displacing a plurality of fans in line along at least one wall, floor or ceiling of the room at a displacement speed; and (c) adjusting the displacement speed based upon temperatures measured by said temperature detectors to make the defrosting more uniform.

9. A room for bringing products to, or holding products at, a desired temperature, said room comprising:

first means for supplying heat to or removing heat from the room;

measuring means for measuring temperatures at a plurality of locations in the room;

a plurality of fans for circulating air in the room;

displacement means for moving the plurality of fans within the room from one position to another; and control means for adjusting the movement of the plurality of fans in response to temperatures measured by said measuring means.

10. A room according to claim 9, wherein the plurality of fans are disposed in a line one above another.

11. A room according to claim 10, wherein the first means supplies heat to the room.

12. A room according to claim 13, wherein the first means removes heat from the room.

13. A combination for bringing products to or holding products at a defined temperature, said combination comprising a room, a first apparatus for supplying heat to or removing heat from the room, a plurality of detectors for measuring temperature at a plurality of locations in the room, a plurality of fans disposed in a first line and spaced apart from one another, and a second apparatus for moving the plurality of fans in line along at least one wall, floor or ceiling of the room.

14. A combination according to claim 13, wherein the plurality of fans are disposed one above another and the combination further comprises a second plurality of fans spaced apart from one another and disposed one above another in a second line.

15. A combination according to claim 13, further comprising a measuring and control apparatus for adjusting a speed at which the plurality of fans moves along said at least one wall, floor or ceiling based upon temperatures measured by said detectors.

16. A combination according to claim 13, wherein the first apparatus supplies heat to the room.

17. A combination according to claim 13, wherein the first apparatus removes heat from the room.

18. In a method of defrosting products in a room comprising positioning temperature detectors in a plurality of locations in said products; actuating a supply of heat to heat air in said room; and controlling the supply of heat while monitoring temperatures in said products with said temperature detectors; the improvement comprising (a) circulating the air in the room with a plurality of fans by displacing the plurality of fans in line along at least one wall, floor or ceiling of the room; and (b) controlling a speed of displacing the plurality of fans based upon the temperatures detected at the temperature detectors to provide for a uniform defrosting of the products.

19. A room for bringing products to, or holding products at, a desired temperature, said room comprising:

first means for supplying heat to or removing heat from the room;

measuring means for measuring temperatures at a plurality of locations in the room;
a plurality of fans for circulating air in the room; and
control means for adjusting movement of the plurality of fans in response to temperatures measured by said measuring means.

20. A room according to claim 19, wherein the plurality of fans are disposed in a line and spaced apart from one another, and wherein the control means adjusts a rotational speed or intensity of the plurality of fans.

* * * * *